United States Patent [19]
Garner et al.

[11] Patent Number: 5,527,063
[45] Date of Patent: Jun. 18, 1996

[54] AIR BAG RETENTION SYSTEM

[75] Inventors: Brett R. Garner, South Weber; Russell P. Lee, Ogden, both of Utah

[73] Assignee: Morton International, Inc., Chicago, Ill.

[21] Appl. No.: 430,333

[22] Filed: Apr. 28, 1995

[51] Int. Cl.6 .................................................. B60R 21/16
[52] U.S. Cl. .................................. 280/728.2; 280/743.1
[58] Field of Search ........................... 280/728.1, 728.2, 280/728.3, 731, 732, 743.1

[56] References Cited

U.S. PATENT DOCUMENTS

| | | | |
|---|---|---|---|
| 3,778,085 | 12/1973 | Lipkin | 280/732 |
| 4,842,300 | 6/1980 | Ziomek et al. | 280/732 |
| 5,195,775 | 3/1993 | Komerska et al. | 280/732 |
| 5,255,937 | 10/1993 | EmamBakksh et al. | 280/732 |
| 5,326,131 | 7/1994 | Yokota et al. | 280/728.2 |

FOREIGN PATENT DOCUMENTS 4146840  5/1992  Japan.

*Primary Examiner*—Paul N. Dickson
*Attorney, Agent, or Firm*—Philip C. Peterson; Charles N. Lovell; Gerald K. White

[57] ABSTRACT

An air bag retention system for securing a gas filling or inlet end of an inflatable air bag during deployment along a delivery chute extended toward a panel opening in a motor vehicle, includes an air bag having at least one pocket on an outside surface opening toward the panel. The delivery chute includes at least one retaining tab having a free end extending into the air bag pocket toward the inlet end for preventing the inlet end of the air bag from moving out of the chute during the rapid inflation thereof in response to generated gas flowing rapidly into the air bag.

21 Claims, 3 Drawing Sheets

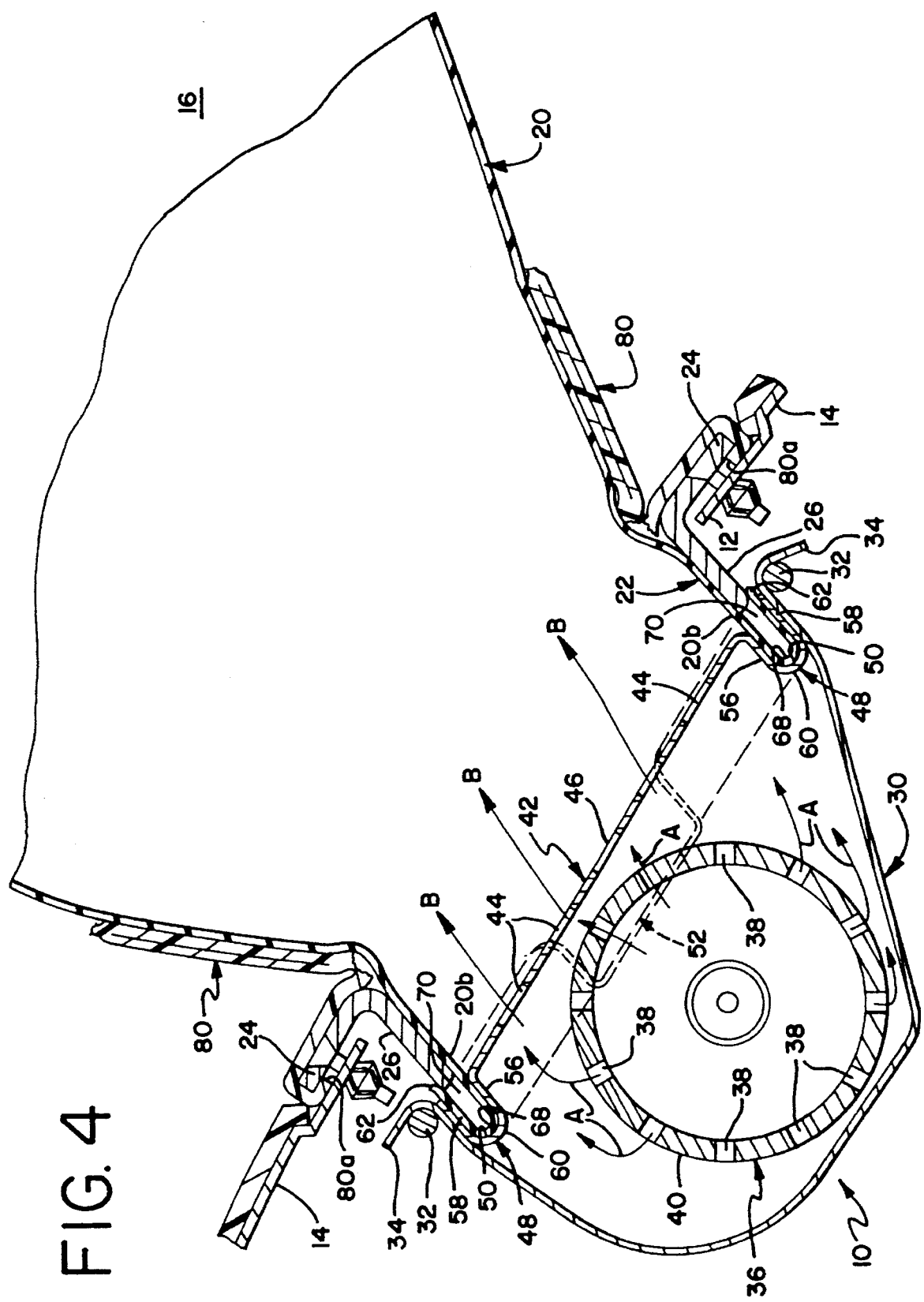

AIR BAG RETENTION SYSTEM

BACKGROUND OF THE INVENTION

1. Field of the Invention

The present invention relates to a new and improved air bag retention system designed to positively hold and retain the inlet or filling end of the air bag from movement down a deployment chute toward a panel opening during rapid inflation of the air bag when deployed in an emergency.

2. Background of the Prior Art

One of the problems associated with the rapid deployment of air bag safety cushions in motor vehicles is the fact that sometimes the inlet end or filling end of the air bag becomes loose or detached from the adjacent fixed member of the air bag system allowing the whole bag to move away from the source of filling gas so that the full and rapid inflation of the air bag does not take place.

Futile efforts have been made to find ways for retaining the inlet end of an air bag which are both operationally effective and also cost effective, but particularly in the latter case such retaining systems tend to greatly complicate the structures involved and the initial assembly process.

U.S. Pat. No. 5,326,131 discloses an air bag mounting structure which requires multiple fasteners, requires retaining projections to be struck from the wall of a retaining enclosure and which requires the formation of slots or openings in the air bag through which the projections must pass.

U.S. Pat. No. 4,842,300 discloses a vehicle air bag module with an internal reinforcing bar requiring holes in the air bag fabric and adjacent components to accommodate multiple fasteners.

U.S. Pat. No. 5,255,937 discloses a vehicle air bag with a continuous frame retainer requiring multiple fasteners in the form of rivets to be utilized along with the necessary rivet holes and installation procedures.

U.S. Pat. No. 5,195,775 discloses a vehicle air bag module employing a continuous inner frame that is riveted in place to hold the gas inlet end of an air bag in place.

Japanese patent publication 4-146840(A) discloses an air bag system having an air bag with an inlet end retained in place around an inflator canister with a flange and multiple fasteners.

OBJECTS OF THE INVENTION

It is an object of the present invention to provide a new and improved air bag retention system which does not require the use of separate fasteners to secure in place the inlet or gas filling end of the air bag during deployment.

Another object of the present invention to provide a new and improved air bag retention system which requires no holes, slots or apertures to be formed in the air bag itself and none in the surrounding structure for retaining the inlet or filling end of the air bag in place during deployment.

Still another object of the present invention to provide a new and improved air bag retention system which is exceptionally easy to assemble and install in a motor vehicle behind a panel opening therein.

A still further object of the present invention to provide a new and improved air bag retention system which employs at least one external pocket formed on the outside surface adjacent the inlet or filling end of an air bag which receives a retainer tab of a delivery chute for directing the inflating air bag toward a panel opening in the vehicle.

Another object of the present invention to provide a new and improved air bag retention system which is economical and relatively simple in construction and installation and which is extremely reliable in operation.

BRIEF SUMMARY OF THE PRESENT INVENTION

The foregoing and other objects and advantages of the present invention are accomplished in a new and improved air bag retention system for securing a gas inlet or filling end of an inflatable air bag cushion during deployment along a delivery chute extended toward a panel opening in a motor vehicle. The air bag includes at least one pocket on an outside surface opening toward the panel, and the delivery chute includes a cooperative retaining tab having a free end extending into the external pocket on the air bag, toward the inlet end for preventing the inlet end from moving out of said chute during rapid inflation thereof as the inflation gas flows rapidly in to fill the air bag cushion.

BRIEF DESCRIPTION OF THE DRAWINGS

For a better understanding of the present invention, reference should be had to the following detailed description taken in conjunction with the drawings, in which:

FIG. 4 is a cross-sectional view similar to FIG. 1, but illustrating the air bag of the system in an inflated condition for cushioning an occupant of a motor vehicle.

DETAILED DESCRIPTION OF A PREFERRED EMBODIMENT OF THE INVENTION

Figure 1:
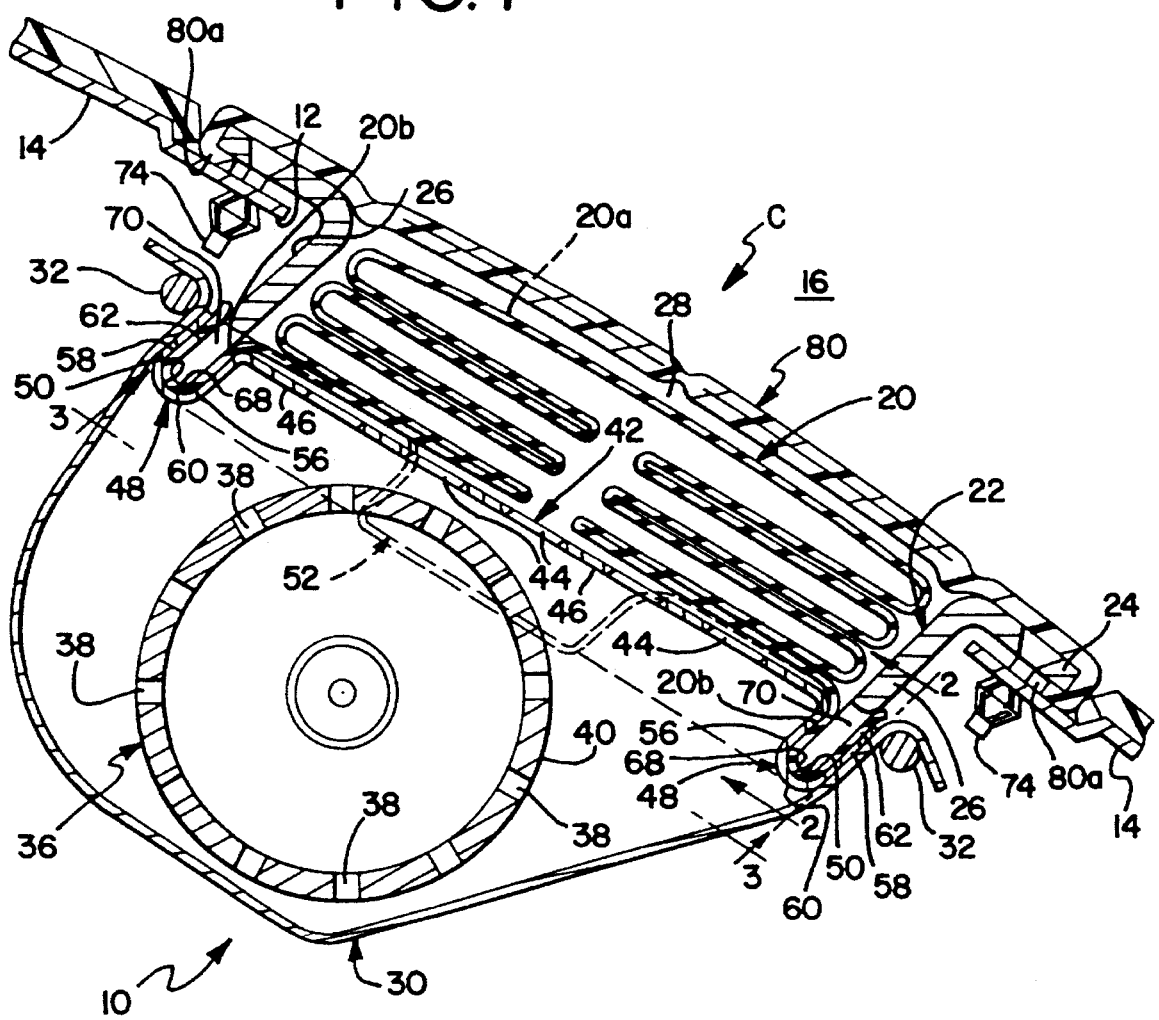
FIG. 1 is a longitudinal cross-sectional view taken through a panel in a motor vehicle in which is installed a new and improved air bag retention system in accordance with the features of the present invention.

Referring now more particularly to the drawings in FIGS. 1 and 4 is illustrated a new and improved air bag retention system 10 constructed in accordance with the features of the present invention and designed for installation behind a panel opening 12 formed in a panel 14 of a passenger compartment 16 in a motor vehicle. The system 10 includes an inflatable air bag 20 formed of thin, flexible sheet material and designed to be rapidly inflated with gas (FIG. 4) for providing a protective resilient cushion for a vehicle occupant in an emergency.

Figure 3:
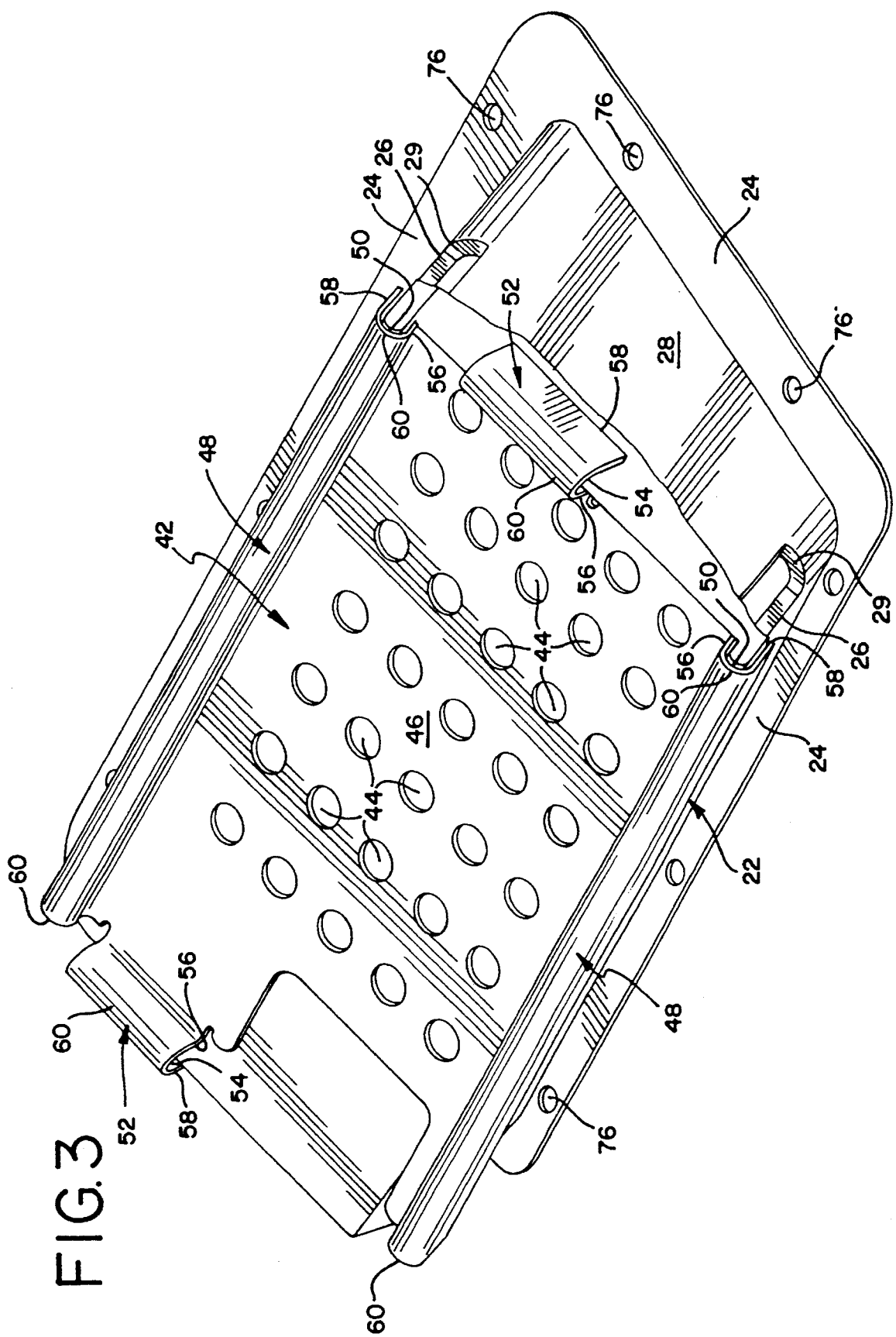
FIG. 3 is a back side perspective view of a diffuser wall and delivery chute of the system looking in the direction of Arrows 3—3 of FIG. 1.

The air bag 20 is normally retained in a folded-up condition (FIG. 1) inside a delivery chute 22 having a peripheral mounting flange 24 around an open, upwardly and rearwardly directed end facing an occupant in the passenger compartment sitting rearward of the panel opening 12 in the vehicle. The delivery chute 22 has a generally rectangular transverse cross-section on a plane parallel of the peripheral mounting flange 24 and is bounded by a pair of spaced apart, opposite side walls 26 and a pair of opposite, spaced apart, vertical end walls 28 integrally joined to the side walls at rounded corners 29 as shown in FIG. 3.

In accordance with the present invention, the delivery chute 22 is open at a forwardly and downwardly facing end in direct communication with a housing 30 that is fixedly mounted in the vehicle by fasteners 32 extending horizontally along opposite sides of the housing. The fasteners 32 are supported from brackets or other suitable supports (not shown) provided in the motor vehicle beneath the panel 14 at opposite ends of the air bag deployment opening 12.

The rearwardly and upwardly facing open end of the housing 30 is formed with a pair of mounting flanges 34 that provide strength and stiffness for the structure and these flanges are bent outwardly around the horizontal fasteners 32 to positively position and secure the housing in place as shown in FIGS. 1 and 4. A forwardly facing end portion of the housing 30 is closed off and is adapted to rearwardly deflect (Arrows "A"—FIG. 4) hot gas that is generated in an air bag inflator 36 mounted in the housing. When the inflator 36 is activated by an electrical signal during an emergency, gas generant material contained therein is ignited and hot gases flow rapidly out through ports 38 formed in a canister or body 40 of the inflator to rapidly inflate the air bag 20 for cushioning a vehicle occupant to reduce injury.

In order to more evenly distribute the flow of generated gas moving rapidly out to inflate the air bag 20, a diffuser 42 having a plurality of perforations 44 is provided to extend across the open end of the housing 30 between the inflator 36 and the air bag. The diffuser 42 has a generally flat, rectangular-shaped main wall 46 with integrally formed, flanged edge structures 48 extending horizontally along opposite edges providing a pair of rearwardly and upwardly facing edge recesses 50. Similar but shorter in length flanged end structures 52 are formed at opposite ends of the main perforated wall 46 providing rearwardly facing end recesses 54. The edge recesses 50 and end recesses 54 are generally U-shaped in transverse cross-section and each includes an inner flange wall 56 at right angles to the main wall 46 and a spaced apart outer flange wall 58 integrally joined by a curved bottom wall 60 forming the end or bottom of a recess 50 or 54 that is open at the opposite end facing the panel opening 12.

In accordance with the present invention, the air bag 20 has a closed outer end 20a and an open inlet or filling end 20b for receiving hot gas from the perforations 44 of the diffuser 42 when the inflator 36 is activated as shown by the Arrows "B" in FIG. 4. In order to positively secure and hold the open end 20b of the air bag 20 in place within the delivery chute 22 during air bag deployment, a plurality of pockets 62 of generally rectangular shape (FIG. 2) are formed on the outside surface of the air bag fabric by lines of stitching 64 or other fastening means. Each pocket 62 has a rearwardly and upwardly facing open end 66, side edges formed by stitching lines 64 and a closed bottom 68 formed by a fold line.

The delivery chute 22 is formed with a plurality of integral retaining tabs 70 along the lower edges of the side walls 26 spaced apart by grooves 72 (FIG. 2) so that each tab can fit into a pocket 62 on the inlet end 20b of the bag 20 and thereby insure that the inlet end of the bag does not collapse or close during rapid air bag inflation and that the inlet end of the bag is positively retained in the delivery chute upon air bag deployment.

Figure 2:
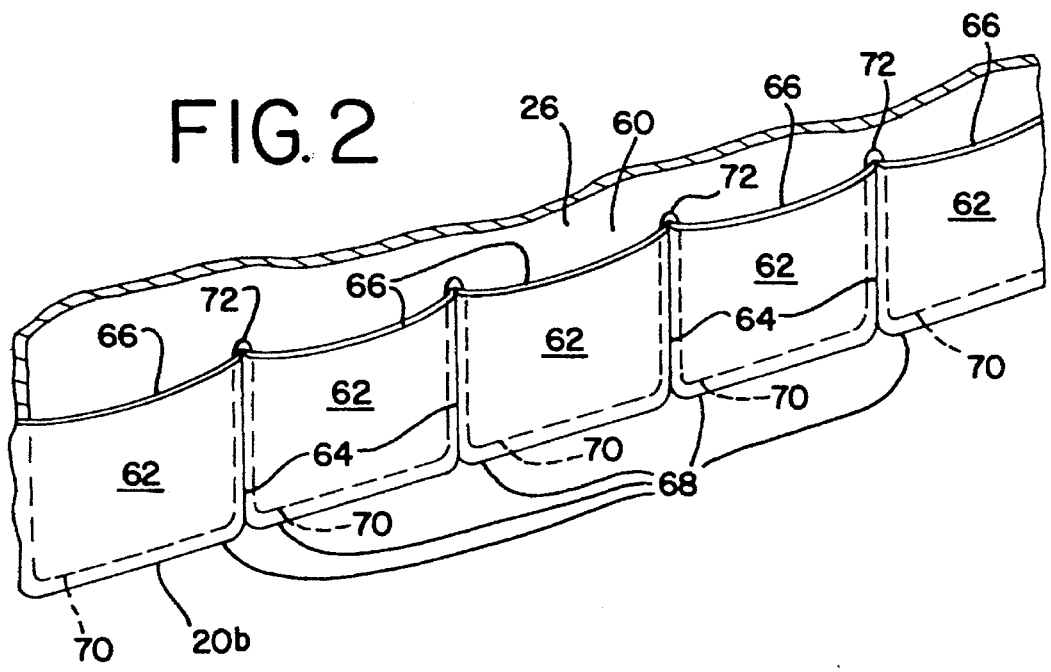
FIG. 2 is a fragmentary view taken substantially along lines 2—2 of FIG. 1 illustrating the unique structure for positively holding and retaining movement of the air bag during rapid inflation thereof.

In accordance with the present invention, the air bag system 10 does not require fasteners such as rivets, bolts, etc., to assemble the components thereof and in addition the unique design provides for easy and rapid installation in a motor vehicle. As illustrated in FIGS. 2 and 3, the tabs 70 of the delivery chute 22 are extended into the outer pockets 62 along the inlet end 20b of the air bag 20. The diffuser 42 is then assembled onto the chute 22 and the air bag 20 with the air bag pockets 62 receiving the tabs 70 and both projecting into the recesses 50. The inner and outer walls 56 and 58 of the flanged edge structures 48 and 52 are then crimped toward each other to pinch and hold the air bag 20, the diffuser 42 and the chute 22 together permanently. These assembled components are then moved into the open end of the housing 30 through the panel opening 12 until the outer walls 58 of the flanged edge structures are forced or press-fitted tightly against adjacent inside surfaces of the housing wall at the open end.

Installation of the assembled diffuser 42, air bag 20 and delivery chute 22 into the housing 30 as described is accomplished with a unidirectional thrust generally indicated by the Arrow "C" in FIG. 1, and the direction of thrust is parallel to the tabs 70. The outer perimeter flange 24 of the air bag delivery chute 22 is provided with a plurality of unidirectional, self-locking type, expandable fasteners 74 which extend through openings 76 in the flange and appropriately located openings in the panel 14 along the edges of the panel opening 12. Suitable, expandable, self-locking, unidirectional thrust-type fasteners 74 are disclosed in copending U.S. patent applications Ser. Nos. 08/505,592 and 08/505,793, both filed Jul. 21, 1995, which applications are both assigned to the assignee herein and which applications are incorporated herein by reference.

The air bag 20 is protected in the folded-up condition in the delivery chute 22 as shown in FIG. 1, by a frangible panel door or cover 80 which breaks open under the pressure of the rapidly inflating air bag 20 as shown in FIG. 4. The cover has inturned flanged edges 80a along upper and lower horizontal sides which are sandwiched between the perimeter flange 24 of the delivery chute 22 and the upper surface of the panel 14 along the edges of the panel opening 12. The expandable, self-locking, unidirectional fasteners 74 positively secure the cover 80, the delivery chute 22 and the air bag 20 in a protected position until air bag deployment occurs.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An inflatable air bag system for mounting behind an air bag deployment opening in a panel of a motor vehicle, comprising:

housing means containing a gas generating inflator and adapted to be fixedly secured to the vehicle, said housing means having a rearwardly facing open end; and an air bag deployment chute containing a rapidly inflatable flexible air bag in folded up condition, said chute including a rearwardly facing open end and an opposite forwardly facing end;

said air bag having an inlet end for receiving adjacent gas during inflating deployment and a plurality of pockets formed on an outer surface therefor which are closed adjacent said inlet end and having rearwardly facing open ends spaced from said inlet end, said chute having a plurality of adjacent forwardly projecting tabs extending into said open end of said pockets for securing said inlet end of said air bag against rearward ejection during air bag deployment.

2. The inflatable air bag system of claim 1, wherein:

said inlet end of said pockets comprises folds of said air bag.

3. The inflatable air bag system of claim 2, wherein:

said pockets have spaced apart opposite edges extending rearwardly toward the panel opening.

4. The inflatable air bag system of claim 3, wherein:

said opposite edges of said pockets are formed by a row of stitching.

5. The inflatable air bag system of claim 4, wherein:

said tabs have free forward ends adjacent said folds in said pocket.

6. The inflatable air bag system of claim 5, wherein:

said tabs have opposite side edges extending rearwardly of said forward ends spaced inside said opposite edges of said pockets.

7. The inflatable air bag system of claim 1, including:

a perforated diffuser wall between said housing means and said deployment chute, said diffuser wall having a flange formed recess along an edge adjacent said open end of said housing means, said pockets of said air bag and said tabs of said chute extending into said recess, and said diffuser wall being press-fitted into said open end of said housing means.

8. The inflatable air bag system of claim 7, wherein:

said flange formed recess includes inner and outer walls integrally joined at a forward end and open at a rear end for receiving said pockets of said air bag and said tabs, said inner and outer walls being crimped toward each other for retaining said inlet end of said air bag and said tabs therebetween.

9. The inflatable air bag system of claim 8, wherein:

said diffuser wall has a plurality of recesses extending along opposite sides; and said outer walls of said recesses are positioned inside of said open end of said housing means and press fitted against adjacent portions of said housing means at said rearwardly facing open end.

10. The inflatable air bag system of claim 9, wherein:

said diffuser wall has at least one of said recesses formed at an end extending between said opposite sides; and said air bag and said chute have at least one pocket and tab, respectively, extending into said at least one recess formed at said end of said diffuser wall.

11. An inflatable air bag formed of flexible sheet material and having a gas filling inlet end for receiving gas for rapid inflation thereof, and a delivery chute for securing said entrance end of said air bag and guiding said air bag toward a panel opening in a motor vehicle during inflation thereof;

said air bag having a plurality of adjacent pockets on an outer surface thereof closed at said inlet end and open at an opposite end facing the panel opening; and said delivery chute having a plurality of adjacent retaining tabs extending into said pockets for retaining said inlet end of said air bag in said chute during inflation of said air bag.

12. The inflatable air bag of claim 11, in combination with:

housing means containing a gas generating inflator adapted to be fixedly mounted in the vehicle and including a rearwardly facing open end for receiving said gas inlet end of said air bag and a forwardly facing open end of said chute.

13. The combination of claim 12, including:

a perforated diffuser extending across said rearwardly facing open end of said housing between said housing and said forwardly facing open end of said chute, said diffuser having a rearwardly facing open recess formed along at least one side adjacent said open end of said housing for receiving and crimped against said inlet end of said air bag and said tabs of said chute.

14. The combination of claim 13, wherein:

said recess of said diffuser includes an inner wall and an outer wall forming a rearwardly facing receiving pocket generally normal to a perforated wall portion extending across said rearwardly facing open end of said housing, said outer wall of said recess pressed into a force fitted holding relationship with an inside surface of said housing.

15. The combination of claim 14, wherein:

said pockets of said air bag and said tabs of said chute are pressed together between said inner and outer wall of said recess when said outer wall is moved into force fitted relationship with said inside surface of said housing at said rearwardly facing open end thereof.

16. The combination of claim 15, wherein:

said chute includes a laterally outwardly extending mounting flange at a rearwardly facing open end overlapping a portion of the panel along an edge of said panel opening; and including:

fastening means for securing said mounting flange to said edge of said panel when said outer wall of said diffuser is moved into force fitted relationship with said housing.

17. The combination of claim 16, wherein:

said fastening means includes a laterally expandable elongated element movable longitudinally in a direction extending transversely between said mounting flange and said edge of said panel opening; and wherein:

said tabs of said chute extend generally in the same direction between said inner and outer walls of said recess.

18. An air bag retention system for securing a gas filling inlet end of an inflatable air bag during deployment along a delivery chute extended toward a panel opening in a motor vehicle;

said air bag including a plurality of adjacent pockets on an outside surface opening toward the panel, said delivery chute including a plurality of adjacent retaining tabs having a free end extending into said pocket toward said filling end of said air bag for preventing said air bag from moving out of said chute during rapid inflation thereof with gas flowing into said filling end.

19. The air bag retention system of claim 18, wherein:

said gas filling inlet end of said air bag has at least two opposite sides and at least one of said pockets on each side, said delivery chute having opposite walls adjacent said opposite sides of said air bag and at least one of said tabs on each wall extending into one of said pockets on said air bag.

20. The air bag retention system of claim 19, including:

housing means containing a gas generating inflator having an open end receiving said inlet end of said air bag and said tabs of said delivery chute.

21. An inflatable air bag system for mounting behind an air bag deployment opening in a panel of a motor vehicle, comprising:

housing means containing a gas generating Inflator and adapted to be fixedly secured to the vehicle, said housing means having a rearwardly facing open end; and an air bag deployment chute containing a rapidly inflatable flexible air bag in folded up condition, said chute including a rearwardly facing open end and an opposite forwardly facing end;

said air bag having an inlet end for receiving gas during inflating deployment and at least one pocket comprised of a fold of said air bag having spaced apart opposite edges extending rearwardly toward the panel opening formed on an outer surface thereof which opposite edges of said at least one pocket are formed by a row of stitching, said at least one pocket is closed adjacent said inlet end and having a rearwardly facing open end spaced from said inlet end, said chute having a forwardly projecting tab extending into said open end of said at least one pocket for securing said inlet end of said air bag against rearward ejection during air bag deployment.

* * * * *

UNITED STATES PATENT AND TRADEMARK OFFICE
CERTIFICATE OF CORRECTION

PATENT NO. : 5,527,063
DATED : June 18, 1996
INVENTOR(S) : Brett R. Garner, et al It is certified that error appears in the above-identified patent and that said Letters Patent is hereby corrected as shown below:

Column 4, line 62, "receiving adjacent gas" should read --receiving gas--.
Column 4, line 63, "of pockets" should read --of adjacent pockets--.
Column 4, line 67, "adjacent forwardly projecting" should read --forwardly projecting adjacent--.
Column 6, line 26, "end overlapping" should read --end for overlapping--.
Column 7, line 1, "Inflator" should read --inflator--.

Signed and Sealed this

Third Day of February, 1998

Attest:

BRUCE LEHMAN

Attesting Officer          Commissioner of Patents and Trademarks